C. H. BRIGGS.
VISCOSIMETER.
APPLICATION FILED FEB. 15, 1915.
1,233,177.
Patented July 10, 1917.
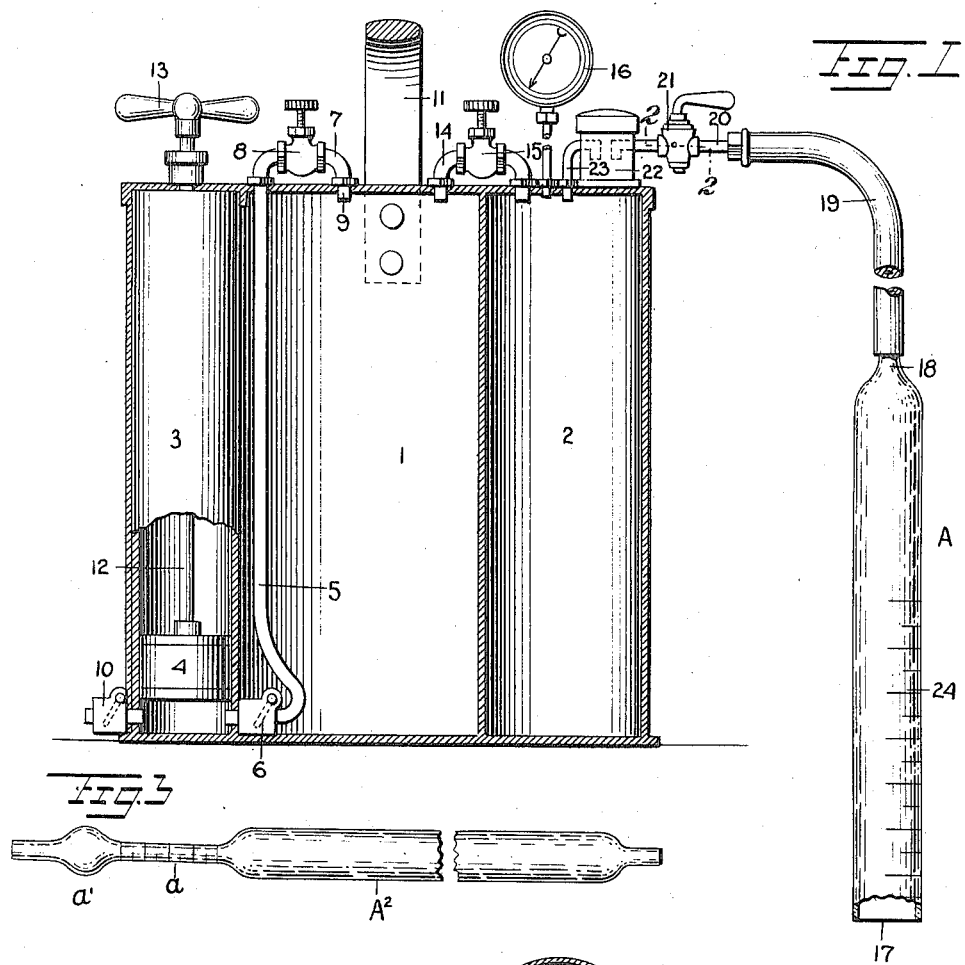
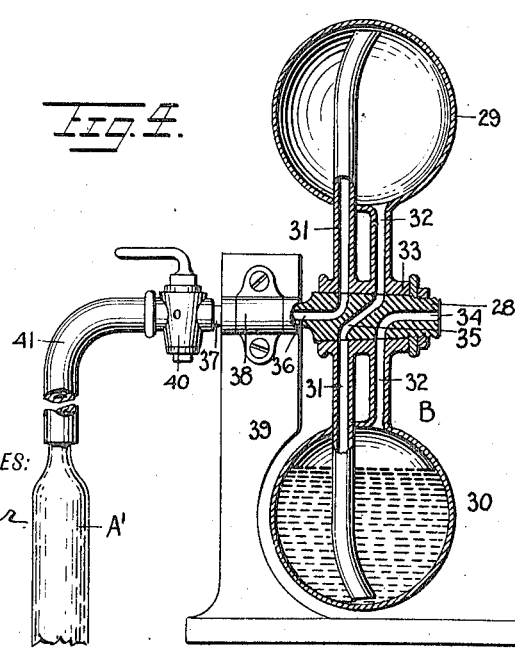
WITNESSES:
H. J. Walker
C. Bradway
INVENTOR
Charles H. Briggs
BY Munn & Co
ATTORNEY

UNITED STATES PATENT OFFICE.

CHARLES H. BRIGGS, OF MINNEAPOLIS, MINNESOTA.

VISCOSIMETER.

1,233,177. Specification of Letters Patent. Patented July 10, 1917.

Application filed February 15, 1915. Serial No. 8,304.

*To all whom it may concern:*

Be it known that I, CHARLES H. BRIGGS, a citizen of the United States, and a resident of Minneapolis, in the county of Hennepin and State of Minnesota, have invented a new and Improved Viscosimeter, of which the following is a full, clear, and exact description.

This invention relates to a viscosimeter especially adapted for testing the viscosity of wheat flour doughs, although it may be used for any kind of dough, batter, paste, or thick viscous semi-solid material, as well as liquids, such as oils, and its general use by bakers enables the manufacture of doughs of proper tenacity and containing the desired amount of water.

The invention has for its general objects to provide a comparatively simple, inexpensive and reliable testing device of the character referred to, which is easily manipulated for quickly and accurately testing the nature of doughs or equivalent material without removing the material from the mixing machine and without loss of material, the invention contemplating the use of an open-ended test tube connected with a suitable source of vacuum whereby the open end of the test tube is placed in contact with the material to be tested, and upon the tube being connected with the source of vacuum a suction will be produced in the tube to draw into the latter the material to be tested, and by means of a scale on the test tube the viscosity of the material can be determined according to the rate of travel of the material into the tube for a given suction.

With a test tube for liquids, the degree of concentration of solutions may be rapidly determined, owing to the fact that the viscosity increases in proportion as greater amounts of material are held in solution by a liquid.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention, and wherein similar characters of reference indicate corresponding parts in all the views, Figure 1 is a sectional view of that type of viscosimeter in which the vacuum is created by a suction pump;

Fig. 2 is a detail view on the line 2—2, Fig. 1, through the controlling valve of the test tube;

Fig. 3 is a view of a test tube especially adapted for testing oils and similar liquids; and Fig. 4 is a sectional view of a modified form of vacuum producing device.

Referring to Fig. 1 of the drawing, the apparatus comprises a suitable structure which is preferably portable and constructed with chambers 1 and 2 which are adapted to be evacuated by any suitable means, as for instance, a hand pump consisting of a cylinder 3 and a piston 4, and communication is provided between the chamber 1 and cylinder 3 through any suitable means, such as a pipe 5, having a check valve 6, and this pipe has an external portion 7 in which is a manually operated cut-off valve 8 that controls communication between the pipe 7 and the chamber 1 at the point 9. The pump cylinder has a valve-controlled outlet 10 whereby the air is drawn from the chambers 1 and 2 and discharged into the atmosphere. The body of the device is provided with a handle or other convenient means 11, and on the rod 12 of the pump piston is a handle 13. Thus by gripping the device by the handle 11 with one hand, the other hand can grip the pump handle 13 and operate the pump to evacuate the chambers 1 and 2. These chambers are connected together by a pipe 14 in which is a cut-off valve 15. The extent of the vacuum in the chamber 2 can be ascertained by a suitable vacuum gage 16 communicating with said chamber.

The apparatus embodies a test tube A, preferably of glass and having an open end 17, and the other end is formed into a nipple 18 to which a flexible hose 19 of suitable length is attached, and this hose is connected with a pipe 20 that includes a controlling valve 21, and this pipe in turn connects with a trap 22 on the top of the chamber 2, and from this trap communication is provided in the chamber 2 through a pipe 23. The test tube has a suitable scale 24 whereby the viscosity of the material being tested can be determined.

In using the apparatus the valve 8 is opened and the pump actuated so as to establish a vacuum in the chamber. The valve 8 is then closed and the valve 15 opened until the desired diminution of pressure is obtained in the chamber 2, as indicated by the indicator 16. The user then places the open end 17 of the test tube against the dough or other material to be tested and thereupon manipulates the controlling valve 21 in order to establish communication between the chamber 2 and the test tube. As a consequence a suction is produced in the test tube whereby the material is drawn into the latter, the rate at which it is drawn in being determined by a certain criterion for a given vacuum or suction, and if the rate of flow corresponds to the criterion the test shows that the material is of the desired consistency and does not require more flour or more water, assuming the material to be dough. If the rate of flow of material into the tube is slow or fast for a standard vacuum it indicates that the dough is not of the proper consistency. When the test has been conducted for a minute, or a more or less time, according to the period determined upon, the valve 21 is closed so as to cut off communication between the test tube and the chamber 2, and at the same time the test tube is vented by the valve 21, so that the material can be easily removed from the test tube. The controlling valve 21 is constructed as shown in Fig. 2, the casing having a vent port 25, and in the plug 26 of the valve is a three-way passage 27 whereby the valve can cut off communication between the chamber 2 and test tube, open communication between them, or vent the test tube A.

In order to make a second test the valve 15 is opened so as to again lower the pressure in the chamber 2, and after the valve 15 is closed the test is proceeded with, as previously described.

In the construction shown in Fig. 4 a different form of device is shown to produce a suction in the test tube A'. This device comprises a central arbor or spindle 28 on which is mounted a rotatable element B which embodies two spherical chambers 29 and 30, and these chambers 29 and 30 are connected by hollow tubes 31 and 32 with a hub 33 rotatably mounted on the spindle, the tubes 31 extending into the balls and terminating adjacent the outer portions thereof, while the tubes 32 connect with the inner portions of the balls. In the spindle is a vent passage 34 adapted to communicate with one of the tubes 32, a cross-connecting passage 35 that is adapted to connect the tube 32 of the upper ball with the tube 31 of the lower ball, and a suction passage 36 which connects with the tube 31 of the upper ball. This passage 36 extends axially through a bearing portion 37 of the spindle, which bearing portion is mounted in the bearing 38 on a support 39, and a three-way valve 40 is connected with the portion 28 of the spindle. A flexible hose 41 connects the valve 40 with the test tube A'. In one of the balls is mercury or other liquid which is adapted to flow from the upper to the lower ball and in so doing tends to create a vacuum in the upper ball, and as this ball is connected with the test tube when the valve 40 is open, a suction will be produced in the test tube, whereby the material to be tested will be drawn into the latter. As the liquid flows from the upper to the lower ball the air in the latter escapes through the vent passage 34. In Fig. 4 the liquid is shown as having passed from the upper to the lower ball, and the suction in the test tube is at its maximum. In making another test it is merely necessary to reverse the position of the balls so that the ball 30 will be at the top, and this automatically starts suction by the liquid flowing from the ball 30 to the ball 29.

A test tube for testing oil or similar fluids may be constructed as shown in Fig. 3, the body $A^2$ of the test tube being connected by a slender neck $a$ with a chamber $a'$, which is in turn connected with the suction-producing device, and this test tube is provided with a suitable scale on the body, as well as on the neck.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A viscosimeter for measuring the rate of flow of material under a predetermined suction thereon, comprising a test tube having a free open end adapted to be placed against the material to be tested, means for producing a predetermined diminution of pressure in the test tube, whereby the material is drawn into the same, and a graduated scale associated with the test tube for measuring the viscosity of the material.

2. A viscosimeter comprising a test tube into which is drawn the material to be tested for determining the viscosity thereof, a vacuum producing device and a valve between them for establishing communication when the valve is in one position, and for cutting off communication and venting the test tube when the valve is in a different position.

3. A viscosimeter comprising a test tube having an open end, a device for producing a predetermined degree of suction in the test tube, valved means for establishing communication between the device and test tube, and means for venting the test tube.

4. A viscosimeter comprising a main chamber, a device for creating a vacuum therein, a secondary chamber, a valved connection between the chambers, a pressure indicator connected with the secondary chamber, a testing instrument into which the rapidity of the act of drawing in the material determines its viscosity, and a valved connection between the secondary chamber and instrument.

5. A viscosimeter comprising a main chamber, a device for creating a vacuum therein, a secondary chamber, a valved connection between the chambers, a pressure indicator connected with the secondary chamber, a testing instrument into which the material to be tested is drawn, and a valved connection between the secondary chamber and instrument, said pump and chamber being combined into a unitary structure.

In testimony whereof I have signed my name to this specification in the presence of two subscribing witnesses.

CHARLES H. BRIGGS.

Witnesses:
 ARNOLD HOBBS,
 HELEN ELLIS.